US012241190B1

(12) United States Patent
Anderson

(10) Patent No.: US 12,241,190 B1
(45) Date of Patent: Mar. 4, 2025

(54) GUIDES FOR LONG-ARM QUILTING MACHINES

(71) Applicant: Allan A Anderson, Millville, DE (US)

(72) Inventor: Allan A Anderson, Millville, DE (US)

( * ) Notice: Subject to any disclaimer, the term of this patent is extended or adjusted under 35 U.S.C. 154(b) by 0 days.

(21) Appl. No.: 18/675,695

(22) Filed: May 28, 2024

(51) Int. Cl.
*D05B 75/06* (2006.01)
*D05B 11/00* (2006.01)
*F16B 2/10* (2006.01)

(52) U.S. Cl.
CPC .............. *D05B 11/00* (2013.01); *D05B 75/06* (2013.01); *F16B 2/10* (2013.01)

(58) Field of Classification Search
CPC ............ D05B 11/00; D05B 75/06; F16B 2/10
See application file for complete search history.

(56) References Cited

U.S. PATENT DOCUMENTS 5,941,291 A * 8/1999 Hardesty ................. B27C 5/003
144/365
8,806,796 B1 * 8/2014 Clifton .................. F41G 11/003
42/127
2009/0218462 A1 * 9/2009 Bogoslofski .............. B60R 9/06
248/288.11
2017/0107652 A1 * 4/2017 McKinney ........... D05B 39/005
2024/0068142 A1 * 2/2024 Abbe ...................... D05B 11/00

FOREIGN PATENT DOCUMENTS

CA 2906090 A1 * 9/2014 ........... A47B 83/021

OTHER PUBLICATIONS

"Precision Ruler Guide for the Bernina Pro Longarm Frames", Manual for the Crosshatch Ruler Bar, 13 pages.

* cited by examiner

*Primary Examiner* — Tajash D Patel
(74) *Attorney, Agent, or Firm* — Maier & Maier, PLLC

(57) ABSTRACT

An edge device for guiding movement of a sew head relative to a stationary rail, in at least one embodiment, includes an edge guide mount and an edge guide pivotally connected to the guide mount. The guide mount has a rigid housing a mounting clamp carried by the rigid housing for mounting the guide device to the stationary rail. The mounting clamp includes a pivoting clamping element persistently biased into a locking position. The edge guide has at least one linear or curved edge for guiding movement of the sew head relative to the stationary rail. In use mounted on the stationary rail, the clamping element in the locking position locks a location of the guide device on the stationary rail.

22 Claims, 10 Drawing Sheets

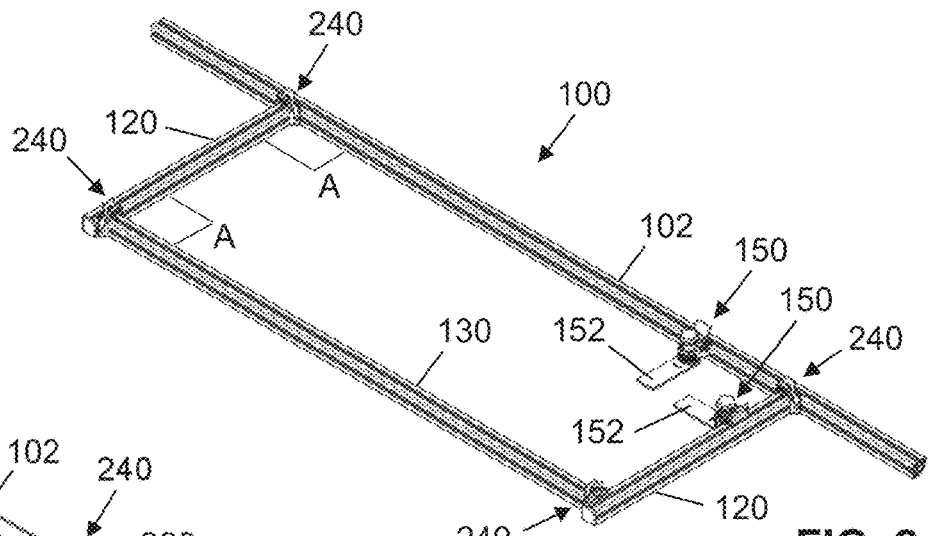
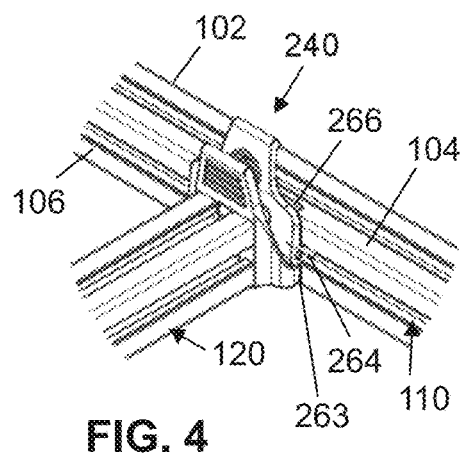
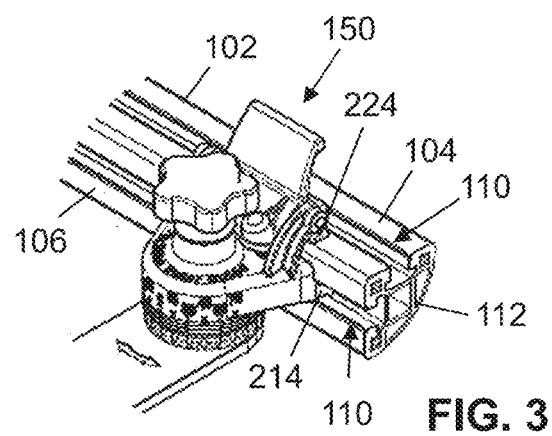
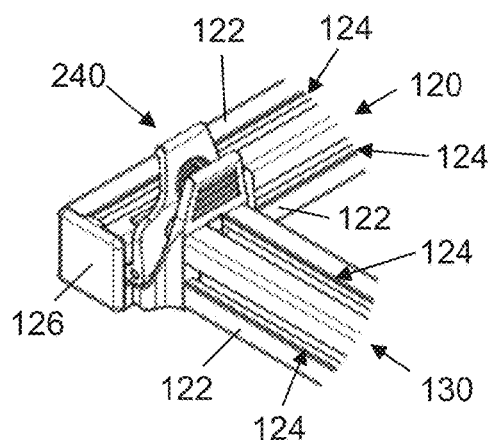
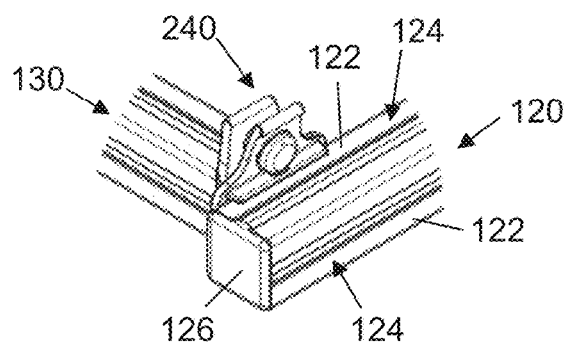

GUIDES FOR LONG-ARM QUILTING MACHINES

TECHNICAL FIELD

The present disclosure relates to accessory devices for machine heads moved by hand, and more particularly to precision guide devices for use with long-arm quilting machines.

BACKGROUND

Sewing systems are available for hobbyists, craftspeople, and professionals for fabrication of large sewn items. A typical sewing system for quilts, sewn banners, and other large creations includes a free moving sew head overhanging working stock suspended between leveling bars and held slightly taut. The sew head glides along travel rails under user control, and additionally at times by programmed movement in some models.

Programming can entail users selecting preset patterns, and in some models user patterns can be entered. Some users, for example hobbyists, may not entirely embrace all available programming or programmed functions of such sew heads, or may utilize a model less functioned for economic or personal preferences. Hobbyists and professionals may prefer or be called upon to apply custom patterns and stitched illustrations for which a free-hand approach to sewing head movement may seem time efficient and more enjoyable. Nonetheless, even custom projects and orders can have regular geometry elements along extended lines or trends for which some movement guidance is desired.

Users apply ad-hoc solutions in a practice regime between automated/robotic movement of sewing heads and unguided free-hand movement. Linear and curved small edge guides are sometime placed by hand upon working stocks for guiding sewing head movement in small areas. However continuing long intended pattern lines and trends among such small areas can render inconsistent results, particularly noticeable for example in larger area items such as quilts having intended symmetry lines along two orthogonal axes and along diagonal vectors therebetween.

Available rail-mounted edge guides can apply more consistent and accurate results, but are typically subject to inconvenient, even clumsy, mounting procedures sometimes requiring partial disassembly of their mounting elements and access to the ends of rails so as to attach a guide and then relocate that guide to a desired location along the rail.

Improvements are needed in mounted guides for sewing systems and movable other tools that overhang workpieces.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

An edge device for guiding movement of a sew head relative to a stationary rail, in at least one embodiment, includes an edge guide mount and an edge guide pivotally connected to the guide mount. The guide mount has a rigid housing a mounting clamp carried by the rigid housing for mounting the guide device to the stationary rail. The mounting clamp includes a pivoting clamping element persistently biased into a locking position. The edge guide has at least a first edge being linear or curved edge for guiding movement of the sew head relative to the stationary rail. In use mounted on the stationary rail, the clamping element in the locking position locks a location of the guide device on the stationary rail.

The mounting clamp may include a rigid fulcrum and a rigid claw each affixed to the rigid housing, the rigid claw being configured for engaging the stationary rail; and the clamping element being pivotally connected to the rigid fulcrum and persistently biased into the locking position by a spring.

The clamping element may include a chuck for engaging the stationary rail and a lever connected to the chuck for pivoting the clamping element from the locking position.

A spring may be trapped between the clamping element and the rigid housing.

The rigid claw can be configured for engaging a slot in the stationary rail.

In some examples, an axle bolt extends through the rigid housing and defines a pivot axis of the edge guide; a retainer is affixed to a semicircular proximal end of the edge guide, the retainer having a cup; and an axle nut is engaged with the axle bolt and trapped in the cup thereby pivotally connecting the edge guide to the guide mount by way of the retainer.

Tightening engagement of the axle bolt and axle nut by rotating the axle bolt optionally increases a resistance to pivoting movement of the edge guide and loosening engagement of the axle bolt and axle nut by counter-rotating the axle bolt optionally decreases the resistance permitting pivoting movement of the edge guide around the pivot axis.

The rigid housing may include an interior circular well at least partially surrounding the pivot axis. The retainer may have a circular bushing received and slidingly engaged by the well thereby maintaining concentricity of the pivoting movement of the edge guide around the pivot axis in cooperation with the axle bolt.

In some examples, at least one spacer is trapped between the retainer and rigid housing, the spacer having an annular ring surrounding the bushing and pivot axis.

The circular bushing may be defined by arcuate segments spaced around the pivot axis.

The spacer may include radially inward extensions connected to the ring, the extensions received by spacings between the arcuate segments.

The retainer can have a dead center mark; and the rigid housing can have a zero-degree mark to which a user can visually align the dead center mark to dispose the edge guide at a defined zero-degree position.

The mounting clamp may include a rigid fulcrum and a rigid arcuate claw each affixed to the rigid housing, the rigid arcuate claw comprising a concave circularly cylindrical contact surface for engaging a cylindrical exterior surface of the stationary rail.

In some examples, the edge guide further includes: a first end by which the edge guide is pivotally connected to the guide mount; a second end opposite the first end; and a second edge for guiding movement of the sew head, the second edge having a repeating shape for guiding a corresponding stitch line in use.

In at least one example: the first edge extends from the proximal end to the distal end, the first edge including at least one mounting hole by which the edge guide is connected to the guide mount; and the second edge extends from the proximal end to the distal end, the second edge including at least one mounting hole for alternatively mounting the edge guide to the guide mount. By repositioning the edge guide from connection of the proximal end to the guide mount to connection of the distal end to the guide mount, mirror image quilting stitch lines can be created in use.

In at least one embodiment, a clamping guide rail for mounting on a stationary slotted rail, the clamping guide rail includes a host guide rail having a first longitudinal end and an opposite second longitudinal end, and a joining clamp. The joining clamp includes: a rigid main body having a forward side connected to the first longitudinal end of the host guide rail; a rigid brace extending rearward from the rigid main body opposite the forward side of the rigid main body to be received in a slot in a forward side of the stationary slotted rail; and a clamping element pivotally connected to the rigid main body and persistently biased into a locking position. The clamping element includes a pivoting slot-engaging member to be received in the slot in the forward side of the stationary slotted rail. In use mounted on the stationary slotted rail, the clamping element in the locking position locks a location of the clamping guide rail on the stationary slotted rail.

The clamping element may include a first upper arm, a lower end of which defines a first pivot point, and a first lower arm extending from the first pivot point at least partially perpendicular to the first upper arm. The first lower arm defines the pivoting slot-engaging member to be received in the slot in the forward side of the stationary slotted rail. A lever can be connected to the first upper arm for pivoting the clamping element around the pivot point from the locking position.

The clamping element may include a rearward extending linear plate above the first upper arm and above the rigid brace for contacting a top side of the stationary slotted rail.

The clamping element may further include: a second upper arm a lower end of which defines a second pivot point colinear with the first pivot point to define a pivot axis of the clamping element; a second lower arm extending from the second pivot point at least partially perpendicular to the second upper arm, the second lower arm be received in the slot in the forward side of the stationary slotted rail; and a yoke connecting the lever to the first upper arm and second upper arm for pivoting the clamping element around the pivot axis from the locking position.

The first upper and second upper arm of the clamping element may extend downward from the yoke and around opposing lateral sides of the rigid brace.

In the locking position of the clamping element, the first lower arm and brace together can implement a jamming engagement with opposing edges of the slot in the forward side of the stationary slotted rail.

The clamping element may further include a downward extending tooth at a distal end of the lower arm for engaging an interior of the slot in the forward side of the stationary slotted rail.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

FIG. 2 is a perspective view of a guide rail system with pivoting edge guide devices, according to at least one embodiment.

FIG. 3 is an enlarged view of a portion of the system of FIG. 2, showing in particular a pivoting edge guide device, according to at least one embodiment.

FIG. 4 is an enlarged view of a portion of the system of FIG. 2, showing in particular a positionable joining clamp fixed on a longitudinal end of a single clamping guide rail.

FIG. 5 is an enlarged view of another portion of the system of FIG. 2, showing in particular a first positionable joining clamp fixed on a first longitudinal end of a double clamping guide rail.

FIG. 6 is an enlarged view of another portion of the system of FIG. 2, showing in particular a second positionable joining clamp fixed on the second longitudinal end of a double clamping guide rail in FIG. 5.

DETAILED DESCRIPTIONS

Figure 1:
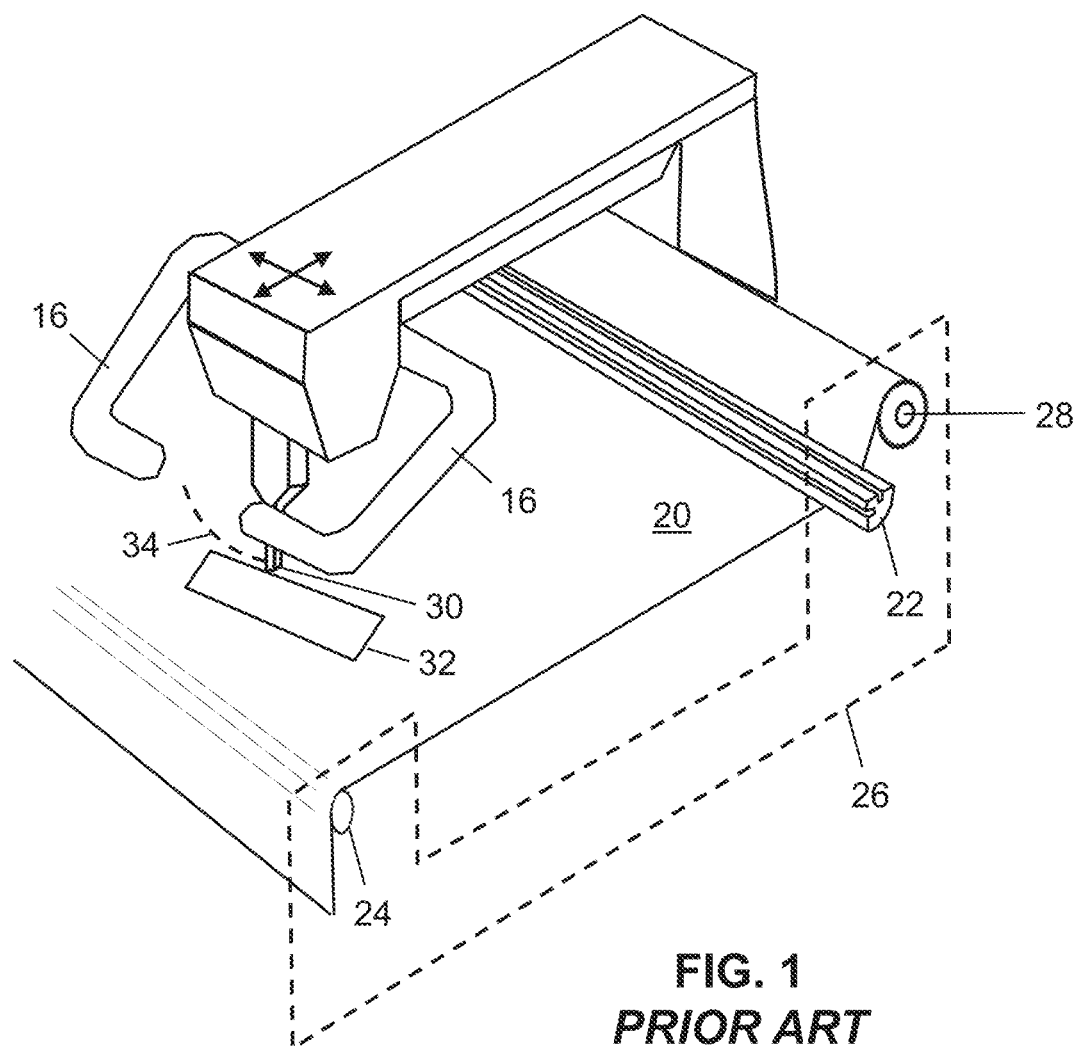
FIG. 1 is a perspective view of a prior art sewing system.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Any materials described are provided as non-limiting examples except where their inclusion is positively and unambiguously asserted. Once materials and arrangements are described herein with reference to any structures and elements thereof, for example in the drawings, such descriptions apply as well to any further same or similar structures and elements that may appear in other drawings.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains.

FIG. 1 is a perspective view of a prior art long-arm quilting machine. A free-moving sew head is mounted for two-dimensional horizontal movement over a work piece. The sew head has a forward handles 16 for manual movement of the machine along travel rails, not shown. A layered working stock 20 extends from a roll wound on a take up bar, under a stationary rearward beveled frame rail 22, also termed a back leveling bar 22, and forward and over a stationary front leveling bar 24. A forward portion of the working stock may drape over the leveling bar 24 and accumulate on another roll depending on user practices. An area between the rearward leveling frame rail and the forward leveling bar 24 defines a working area spanned by a suspended portion of the working stock 20. The leveling bar 22 and leveling bar 24 are connected directly or indirectly to the stationary frame 26 of the quilting machine, and are supported by the stationary frame 26, which is represented in part and in dashed line in FIG. 1. The leveling bar 22 and leveling bar 24 are essentially parallel and horizontal to maintain the suspended portion of the working stock as horizontal and slightly taut. The sew head glides along travel rails under user control, and additionally at times by programmed movement in some models.

The working stock 20 represents, in a typical arrangement for quilting, a middle batting layer, lower layer backing fabric, and a top layer or quilt top layer consisting of pieces of fabric stitched together, typically including multiple colors and multiple prints. The job of the long-arm quilting machine is to stitch the multiple layers together with pleasing designs in the stitching.

Under user control, the sewing head travels over the work area as a sewing foot engages the working stock and a reciprocating sewing needle forms a stitch line or curve governed by user movements. At times, users are known to use a small ruler or other freely positioned guide laid upon the workpiece and held there by hand. By sliding the sewing foot 30 along an edge of a small linear ruler 32, the user guides a stitch line 34 applied to the working stock.

While this approach may apply a stitch line segment that is locally straight, results are sometimes unsatisfactory for long desired stitch lines as the resulting segments may fall out of line due to small offsets by human error in placing the ruler. Even small offsets by slope or position can be particularly noticeable for example on larger work pieces such as quilts intended to have repeating patterns, regular stitch features, tessellations, and any features that are intended to align or visibly register even along intended diagonal lines.

FIG. 2 is a perspective view of a guide rail system 100 with pivoting guide devices 150, according to at least one embodiment. The illustrated guide rail system 100 includes guide rails with clamps by which to interconnect the rails, rendering each as stationary to form stable guiding arrangements for precision operations in the work area. The slotted rails can be arranged by users as desired. The illustrated rearward slotted rail 102 has a slotted planar top 104 (FIG. 3), and an adjacent and perpendicular slotted planar forward side 106, each having a T-slot 110. The lower rearward arcuate side 112 of the slotted rail 112, for example profiled as a quarter circle, smoothly permits the working stock to be taken from and returned to a roll without stressing the working stock, which is generally slightly tensioned during sewing operations. The forward guide rails of the guide rail system 100 of FIG. 2 are illustrated as clamping rails. These include two single clamping guide rails 120 illustrated as spaced and extending fore and aft, and the forward double clamping guide rail 130 spanning the spaced guide rails 120. Each forward guide rail, as its base element, has a four-sided slotted rail in the illustrated embodiments, each side 122 being planar, each side 122 being perpendicular to its adjacent neighbor sides 122, and each side 122 having a respective T-slot 124 (FIGS. 5-6). This assures a high degree of interchangeability of stock material and availability of a slotted forward side and an adjacent top side for engagement by the mountings clamps 210 and 310 described in the following.

Other counts of these guide rails and other elements may be present in other embodiments of a guide rail system within the scope of these descriptions, of which the drawings are made a part at least by this reference. The rearward slotted rail 102 illustrated in FIG. 2, in some embodiments, is already provided in a sewing system, for example as the rearward frame rail 22 as in FIG. 1. In such examples, the guide rail system 100 may be provided with the illustrated forward slotted rails, namely the single clamping guide rails 120, the double clamping guide rail 130, and any number of pivoting guide devices 150, for use with a prior art long-arm quilting machine of which a stationary frame rail 22 is already a part. In other embodiments, the stationary rearward slotted rail 102 may be provided with the system 100 as illustrated (FIG. 2). Moreover, the system 100 may be provided in whole or in part, with any and all components described and illustrated being provided separately and in any combination.

For example, a single clamping guide rail 120 (FIG. 2), having a joining clamp 240 (FIG. 4) fixed on a first longitudinal end, may be available as a stand-alone product and in combination with other products illustrated or otherwise. An edge-beveled end cap 126 closes out the free second longitudinal end opposite the first longitudinal end for aesthetics and to protect the working stock 20 (FIG. 1). In at least one anticipated product offering, a kit for sale will include at least one edge 152 with retainer 172, two spacers 190, one shorter single clamping guide rail 120, and at least one pivoting guide device 150. For the sake of brevity, not all assortments for possible product offerings are listed here.

In another example, a double clamping guide rail 130 (FIG. 2), having a first joining clamp 240 (FIG. 5) fixed on a first longitudinal end, and a second joining clamp 240 (FIG. 6) fixed on a second longitudinal end opposite the first longitudinal end, may be available as a stand-alone product and in combination with other products illustrated or otherwise.

FIG. 3 is an enlarged view of a particularly advantageous and inventive pivoting edge guide device 150, according to at least one embodiment, mounted on a slotted rail as in FIG. 2. The edge guide device 150 is further detailed in the following descriptions with reference to FIGS. 7-10. FIGS. 4-6 show an inventive joining clamp 240 in several installations. The joining clamp 240 is further detailed in the following descriptions with reference to FIGS. 11-15.

Figure 7A:
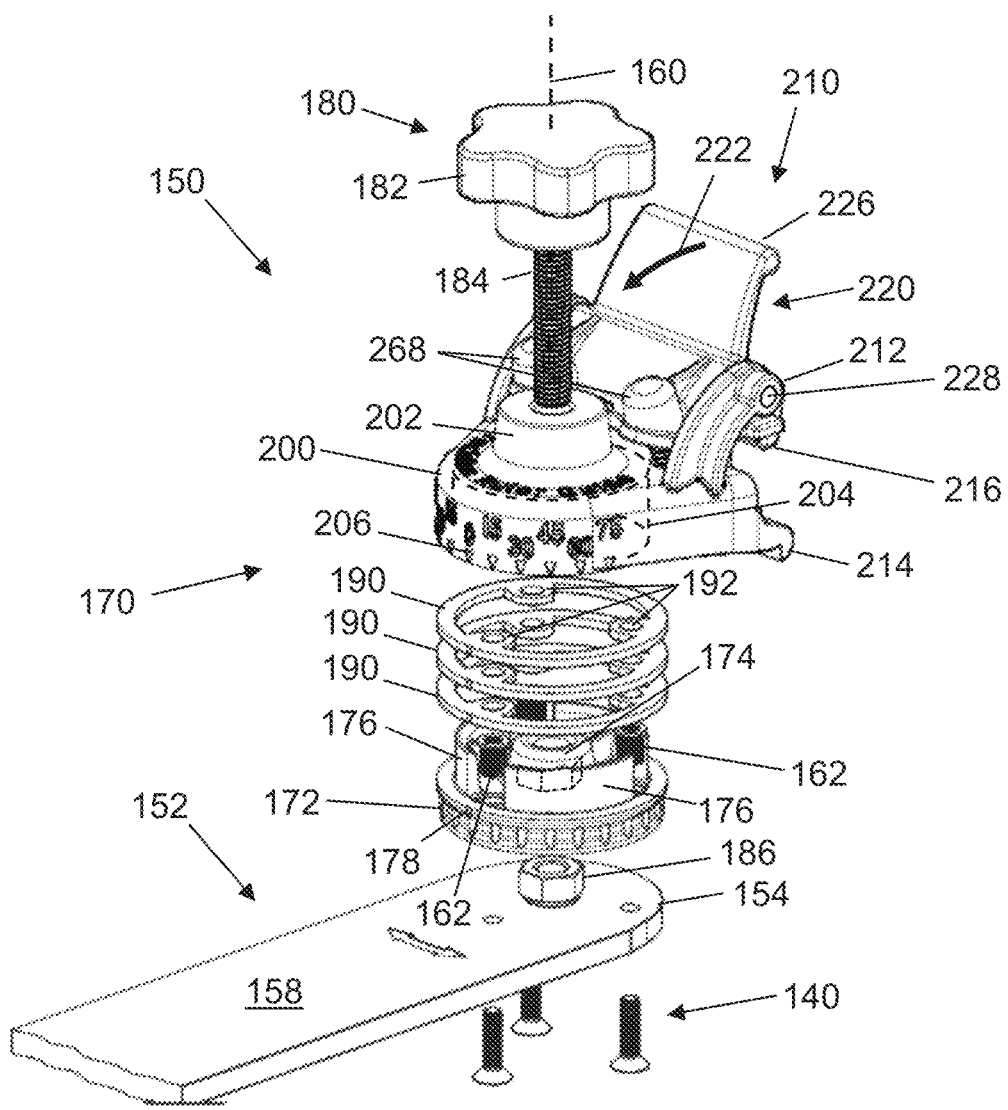
FIG. 7A is an exploded perspective view of a pivoting edge guide device as in FIG. 2, according to at least one embodiment.

FIG. 7A shows the guide device 150, according to at least one embodiment, in exploded view for illustration of components. An edge guide 152 is pivotally connected to the bottom of an edge guide mount 170 for contact or closest proximity with a working stock in use. The proximal end 154 of the edge guide 152 is semicircular to accommodate its rotation about a pivot axis 160 by one hundred and eighty degrees (FIG. 8) against a mounted stationary rail, which is perpendicular to the pivot axis 160 according to the construction of the guide device 150.

Three upward extending fasteners 140 (FIG. 7) are illustrated as bevel head screws having heads flush or slightly sunken along the bottom surface of the edge guide 152 upon assembly. Their threaded shanks extend upward through the edge guide 152 via three corresponding respective holes spaced around the pivot axis 160. The screws are secured at their inward ends by trapped nuts 162 within a generally annular lower component of the edge guide mount 170, referenced as the retainer 172. The retainer 172 is generally thereby fixed to and pivots with the edge guide 152.

Figure 9:
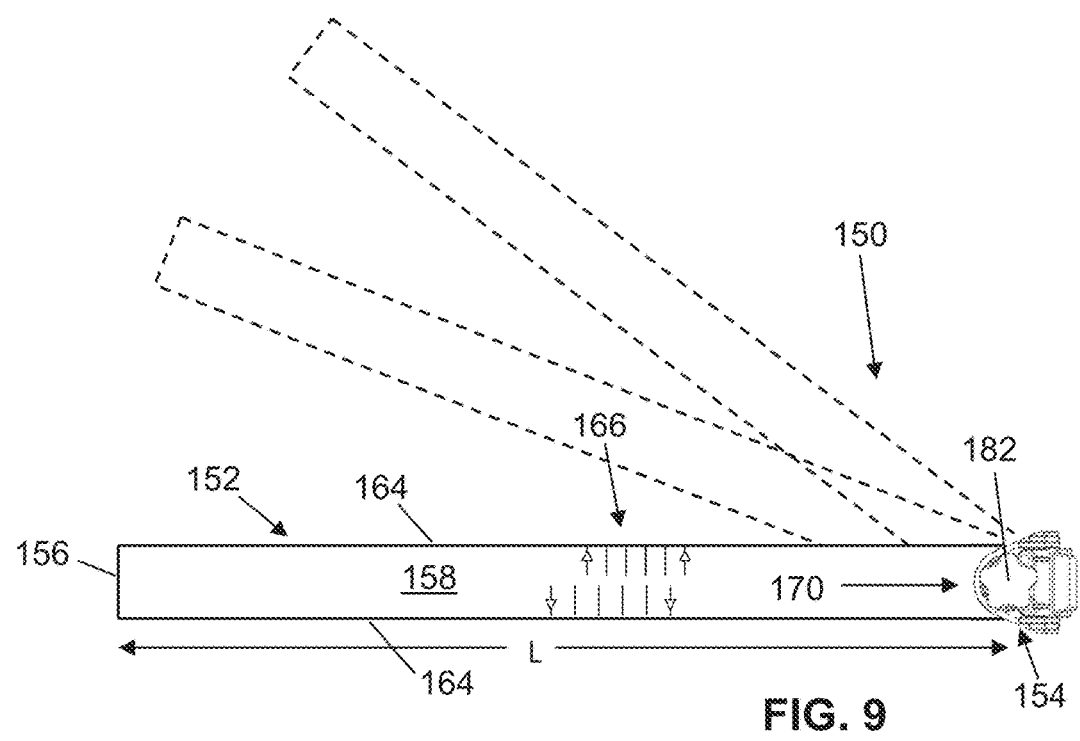
FIG. 9 is an overhead view of the guide device of FIG. 7A with the edge guide shown in whole, according to at least one embodiment, in variable pivoted positions in dashed line.

The edge guide 152 in the illustrated embodiment has a planar rectangular body 158 extending a length L (FIG. 9) from the proximal end 154 pivotally coupled to the edge guide mount 170 to an opposite free distal end 156. Opposing parallel linear edges 164 extend from the proximal end 154 to the distal end 156. Only portions of the edge guides 152 are shown in some of the drawings for representation with limiting the lengths thereof. The length L can vary among embodiments. For example, the length L in non-limiting examples is approximately eighteen inches, and twenty eight inches, which are advantageous lengths for some users and uses over a small linear ruler 32 as in FIG. 1, which may be six inches long for example. Lengths of the single clamping guide rail 120 are dimensioned in some embodiments to permit pivoting of an edge guide 152 within a working area defined between rails of the system 100 for example, laid out as a rectangular area having a minor dimension defined by the single clamping guide rails 120 spanning the space between the rearward slotted rail 102 and the double clamping guide rail 130. As represented in FIG. 9, the edge guide 152 may be ruled and may have indicia 166 in graphical, text, and/or numeric form spaced along the body 158 for in-situ measurements. For example, separate scales may be provided for measurements in inch and centimeter units.

The upper portion or rigid main body of the edge guide mount 170, above the retainer 172, is referenced as the upper housing 200. A threaded fastener, illustrated as an axle bolt 180 having a knobbed upper end 182 and threaded shank 184, maintains the assembly of the upper housing 200 and retainer 172. The axle bolt 180, being freely rotatable relative to the upper housing 200, serves also as the axle for pivoting movement and defines the pivot axis 160. The knobbed end 182 extends upward from a pedestal 202 top portion of the upper housing 200, and the shank 184 extends downward through the pedestal 202 toward the retainer 172.

The retainer 172 has an upward extending cup 174 around which the trapped nuts 162 are spaced. The interior of the cup 174 has a polygonal space, shown in dashed line in FIG. 10, that traps a threaded axle nut 186 when assembled. The shank 184 extends downward through the pedestal 202 and into to the cup 174, and threadingly engages the nut 186, thereby attaching the retainer 172 and edge guide 152 to the upper housing 200 and effecting the guide device 150 as a single adjustable mechanism. Pivoting action of the edge guide 152 relative to the upper housing 200 is governed by tension in the axle bolt 180 according to user applied torque on the upper end. Tightening the engagement of the axle bolt 180 and axle nut 186 by rotating the axle bolt in a first rotational direction using the knobbed upper end 182 increases resistance to pivoting and locks pivotal movement. Conversely, loosening by counter-rotating the axle bolt in a second rotational direction opposite the first rotational direction decreases resistance permitting a user to pivot the edge guide 152 to a desired angular position.

Figure 10:
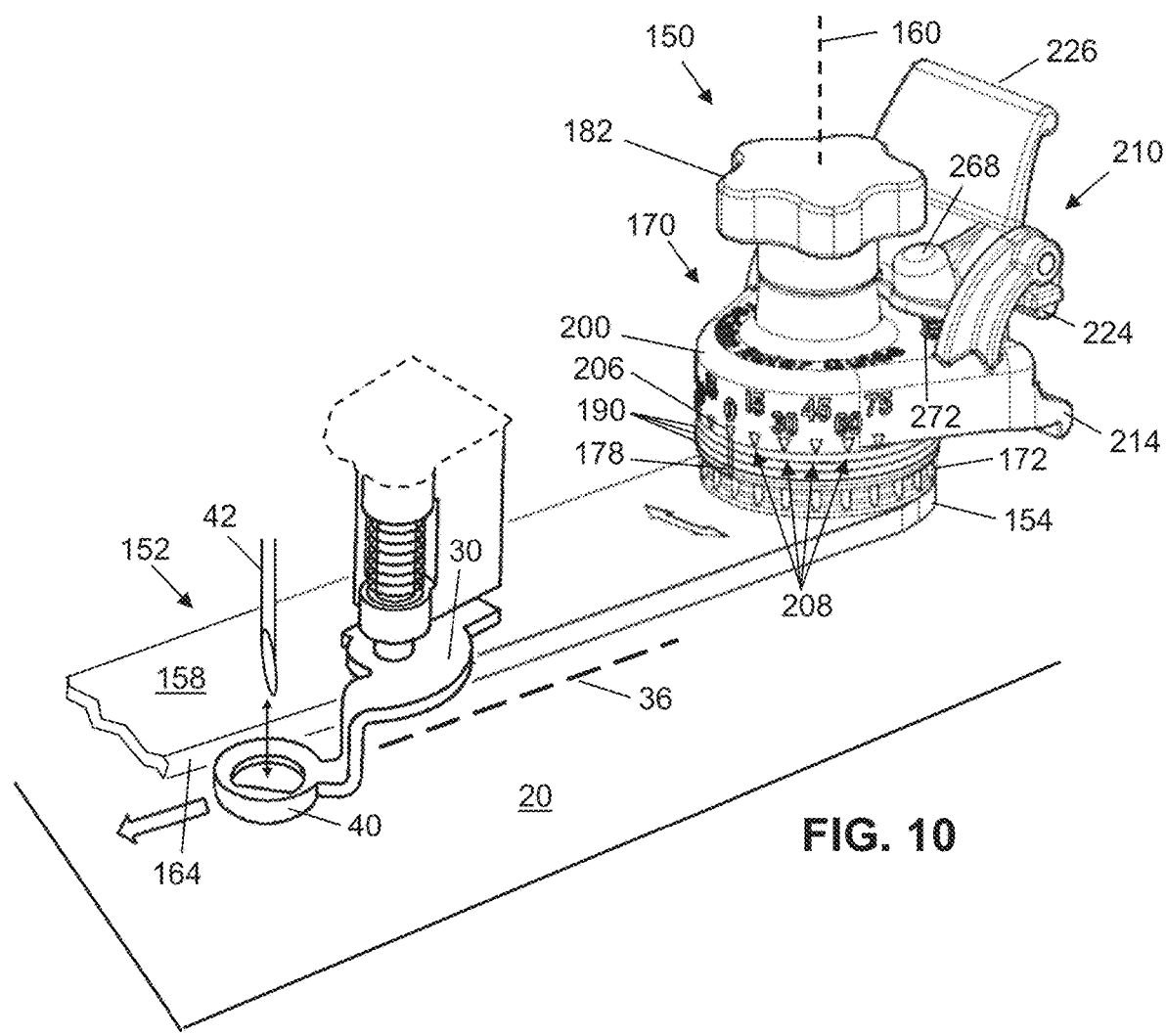
FIG. 10 is a perspective view of the guide device of FIG. 7A, shown in a non-limiting example of use, guiding linear or curved movement in free-hand sewing by engaging the foot of a sewing head.
Figure 11:
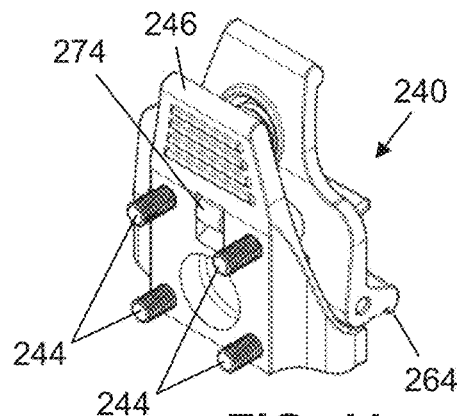
FIG. 11 is a perspective view of a first side of the joining clamp as in FIG. 4 by which the clamp is to be fixed to the longitudinal end of a guide rail.

The upper housing 200 has a downward opening interior circular well 204 at least partially surrounding the pivot axis 160 as shown in dashed line in FIG. 10. The cylindrical interior surface of the well 204 slidingly engages the retainer 172. The retainer 172 has an upward extending circular interrupted bushing defined by arcuate segments 176 spaced around the pivot axis 160. The segments 176 are received and slidingly engaged by the well 204, thereby maintaining the concentricity of the pivotal movement of the edge guide 152 around the pivot axis 160 in cooperation with the axle bolt 180. The segments 176 extend sufficiently far upward to accommodate height adjustments of the retainer 172 and edge guide 152 relative to the upper housing 200 as effected by spacers 190, which are further described in the following. Height adjustments are advantageous at least in part due to variations in relative height of the back leveling bar 22 according to various manufacturer specifications, which can vary 5-6 mm above the front leveling bar 24.

A circular outer wall of the retainer 172 has circumferentially spaced index features, including a dead center mark 178. The upper housing 200 has an approximately semicircular outer wall portion also having spaced index features, including a zero degree mark 206 to which a user can visually align the dead center mark 178 to dispose the edge guide 152 at a defined zero degree position as in, for example, FIG. 10. In the illustrated embodiment, the spaced index features along the outer wall of the upper housing 200 have degree indicators 208 (FIG. 10), for example as 15 degrees, 30 degrees, 45 degrees and so forth. These guide a user to dispose the user to dispose the edge guide 152 at oft used angular positions by alignment of the dead center mark 178 with a corresponding index feature having the desired degree indicator. Approximate intermediate positions are also available for use by aligning the dead center mark 178 between degree-numbered index features.

As mentioned in the preceding, height or vertical adjustment of the edge guide 152 relative to the upper housing 200 and rearward mounting clamp 210 is effected by a variable number of spacers 190 (FIG. 7). By adjusting the height of the edge guide 152 relative to the mounting clamp 210, the vertical position of the edge guide 152 is adjusted: relative to a rail to which the guide device 150 is mounted; and relative to a working stock in use. In FIG. 7, spacers 190 are trapped between the retainer 172 and upper housing 200. Each spacer 190 has an annular ring, which surrounds the segments 176 and pivot axis, and radially inward extensions 192 connected to the ring, each having a through hole. The extensions 192 are spaced around the pivot axis 160 to align the through holes with the fasteners that fix the edge guide 152 to the retainer 172. In the illustrated embodiment, having three screws 140 as fasteners, each spacer 190 has three extensions 192 and their through holes align respectively with the upward extending shanks to receive any portions thereof that extend beyond the trapped nuts 174. The extensions 192 also align with, are received by, and engage spacings between the segments 176 that define the interrupted bushing of the retainer 172. The spacers 190 accordingly rotate with the retainer 172 relative to the upper housing 200 as the edge guide 152 is pivoted.

Thus, multiple engaged features maintain concentricity of components around the pivot axis 160 and durability of the guide device 150 as a single adjustable mechanism. Each spacer 190 has an alignment notch for alignment with the dead center mark upon installation of one or more spacers 190 as preferred by a user. The alignment notches, by whatever count of spacers 190, guide user eyes from the dead center mark 178 to any desired angular position of the edge guide 152 relative to the upper housing 200. Any number of spacers 190 can be installed according to user preference. Three are shown in the illustrated embodiment.

The guide device 150 is conveniently partially disassembled by loosening and release of the axle bolt 180 from the trapped axle nut 186, thereby separating the upper housing 200 from the retainer 172, and permitting removal or addition of spacers 190. The retainer 172 and edge guide 152 can remain affixed together during such operations.

The guide device 150 is configured to selectively mount upon the frame rail and guide rails, each having T-slots extending along their lengths. For example as shown in FIG. 3 by way of an illustrated longitudinal end of the frame rail 102, a forward planar side 106 of the rail has a forward T-slot 110 and the top planar side 104 of the rail has a top T-slot 110.

The rigid main body of the edge guide mount 170, referenced as the upper housing 200, carries a rearward mounting clamp 210 defined in part by rigid elements of the main body in cooperation with a spring-biased clamping element 220 (FIG. 10) pivotally connected to the main body. The mounting clamp 210 includes a rigid fulcrum 212, a rigid claw 214, and rigid beam 216, which are all fixed parts of the upper housing 200 in the illustrated embodiment. The claw 214 extends rearward and engages and slides within, for example, the T-slot 110 of the slotted planar forward side 106 of a slotted rail, such as the rearward frame rail 102 as in FIG. 3. The fulcrum 212 extends upward and rearward from the upper housing 200 and carries the spring biased clamping element 220, which is pivotally connected to the fulcrum 212 by a hinge pin 228. The beam 216 extends downward from the fulcrum 212 and has a planar downward facing contact surface for engaging a top surface of a rail when mounted.

The pivoting clamping element 220 has a spaced pair of wells 268, each trapping a respective compression spring 272 (FIG. 10) with the upper housing 200. The springs persistently bias the clamping element 220 to pivot into a locking position, at which the clamping element 220 engages a rail in use. These descriptions relate to examples in which the edge guide device 150 is mounted to a guide rail and/or to the frame rail 102. In the example, in FIG. 2 one edge guide device 150 is mounted on a single clamping guide rail 120, and another edge guide device 150 is mounted on the rearward frame rail 102. In another example (FIG. 7C), an edge guide device 150 is mounted on a single clamping guide rail 120 or a double clamping guide rail 130.

Figure 7B:
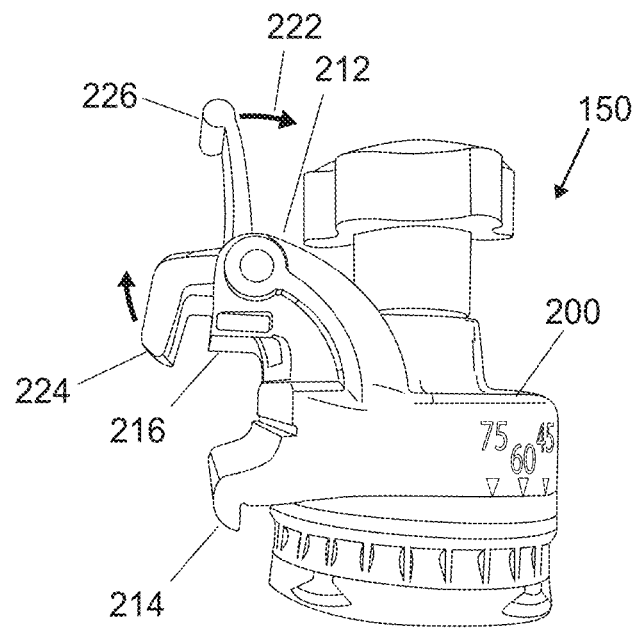
FIG. 7B is a side profile view of the guide device of FIG. 7A, shown assembled, for illustration of the rearward mounting clamp shown open.
Figure 7C:
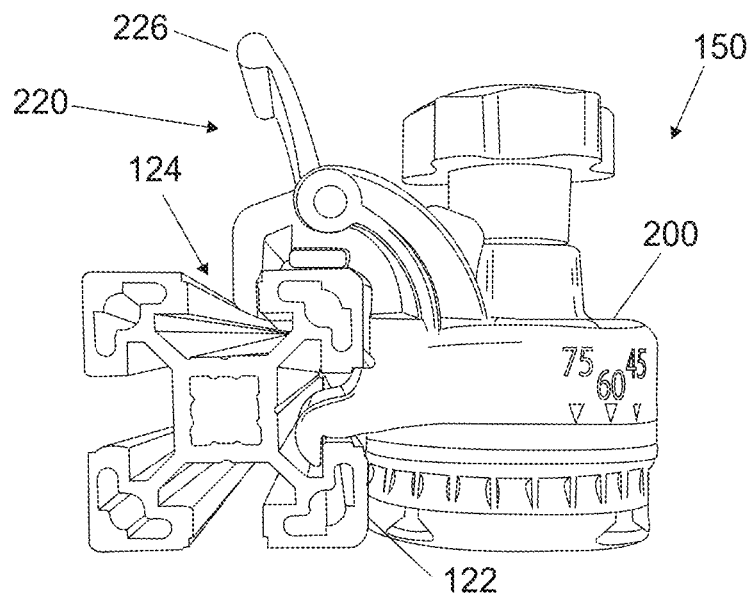
FIG. 7C is a side profile view of the guide device as in FIG. 7B, with the rearward mounting clamp shown closed.
Figure 8:
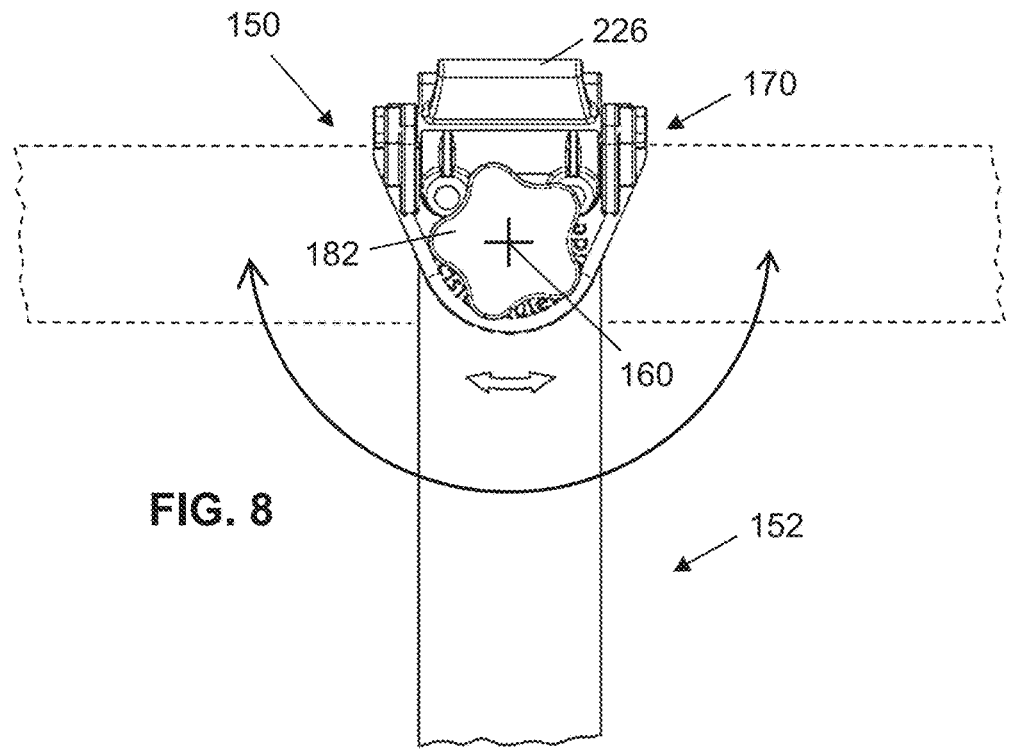
FIG. 8 is an overhead view of the pivoting guide device of FIG. 7A with the edge guide shown in truncated view at variable pivoted positions in dashed line.

The clamping element has a chuck 224 that is received by and engages a top T-slot 124 when mounted on a slotted rail, and a lever 226 connected to the chuck. The lever 226 extends upward and rearward for manual operation of the mounting clamp 210. The clamping element 220 can pivot, as represented by pivot arrows 222 in an unlocking direction in FIG. 7B, from the biased locking position (FIG. 7C) under user force on the lever 226. At the biased locking position, the chuck 224 engages the rail within the top side T-slot 124, applying a braking force against movement along the rail. When the clamping element 220 is pivoted to an unlocked position by the user pulling the lever 226 forward toward the knobbed upper end 182 of the axle bolt, the mounting clamp 210 is opened (FIG. 7B). That is the clamping element is pivoted to an open and unlocked position, at which both the rigid claw 214 freely slides within the forward T-slot and the chuck 224 freely slides within the top-side slot. The permits the guide device 150 to travel along the rail as the beam 116 slides along the top surface thereof to any user preferred location. Upon release of the lever 226, the clamping element 220 returns to its biased locking position thereby arresting movement of the guide device 150 when mounted on a slotted rail, locking the location of the guide device 150 on the rail by automatic engagement by the chuck 224 within the top-side slot.

The mounting clamp 210 of the guide device 150 is advantageous over some attaching arrangements of prior devices and accessories that mount on slotted rails. For example, an anchor with a trapped head is often used for mounting accessories to a slotted rail, with the head entered into the wide portion of the slot from a longitudinal end of the rail. Such an arrangement is not convenient for mounting such an accessory along a rail with other such accessories, which are ordered along the rail according to the fixed order in which they are installed. Nor is such an arrangement even convenient where a slotted rail is long such that considerable travel by the head within the slot is necessitated to reach a desired location for just one accessory.

Advantageously, the guide device 150 can be installed onto a slotted rail by holding the clamping element 220 in its open position by use of the lever 226, inserting the claw 214 into a forward side slot and placing the beam 216 into contact with the top side 122 of the rail at approximately the desired location, and releasing the lever, effectively snapping the guide device 150 into engagement with the rail. By use of the lever 226, the guide device can be easily connected to and disconnected from a slotted rail.

FIG. 10 shows an edge guide device 150 in use guiding a linear stitch line 36. In the illustrated non-limiting example of use, a user guides linear movement in free-hand sewing by engaging the foot 30 of a sewing head as a reciprocating needle 42 applies the stitch line. The illustrated foot has a circular guide ring 40 that slides along a linear edge 164 of the edge guide 152. Although not expressly illustrated in FIG. 10, the edge guide device 150 in such use would likely be mounted on a slotted rail as shown in the examples of FIG. 2 for stability and truing of the zero degree mark 206 and degree indicators 208 with respect to the working stock 20 and to a sewing system frame.

Figure 12:
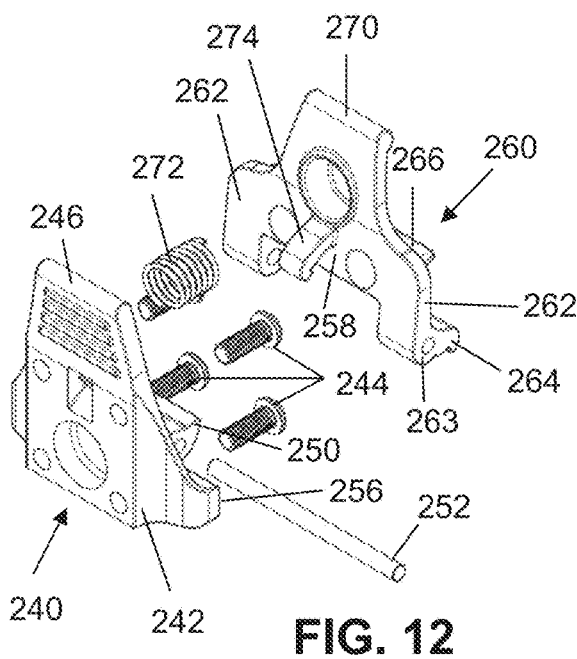
FIG. 12 is an exploded perspective view of the joining clamp of FIG. 11.
Figure 13:
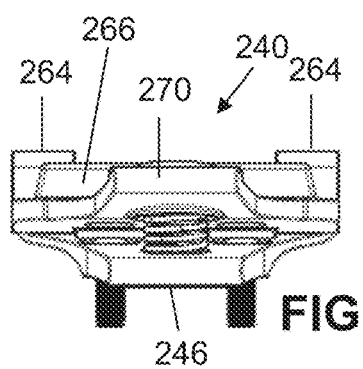
FIG. 13 is an overhead view of the joining clamp of FIG. 11.
Figure 15:
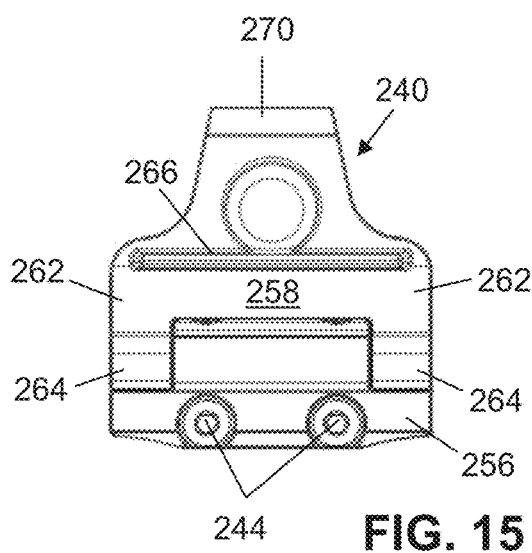
FIG. 15 is an elevation view of a second side of the joining clamp opposite that shown in FIG. 11.
Figure 14:
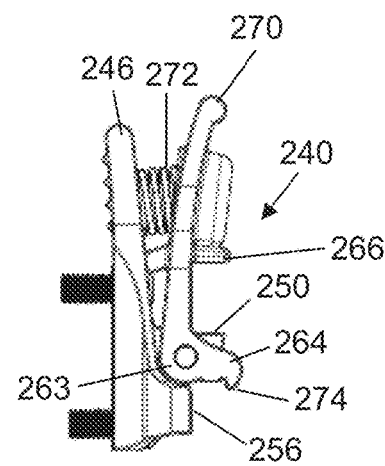
FIG. 14 is a side elevation view of the joining clamp of FIG. 11.

These descriptions now turn to the inventive joining clamp 240 shown in several installations in FIGS. 2 and 4-6. The joining clamp 240 is further detailed in the following descriptions with reference to FIGS. 11-15. The illustrated clamps 240 are referenced as joining clamps 240 with respect to their function in tentatively and selectively joining guide rails at approximately right angles. As shown in in FIG. 11, a joining clamp 240 has a rigid main body 242 rigidly attached at a forward first side thereof to the longitudinal end of a host guide rail, example as shown in FIGS. 4-6, by at least one fastener, illustrated as four screws 244 (FIG. 12). In particular in FIG. 4, the single clamping guide rail 120 serves as the host guide rail for a joining clamp 240; and, in FIGS. 5-6 the double clamping guide rail 130 serves as the host guide rail for a respective joining clamp 240 at each longitudinal end. Once attached, the joining clamp(s) and host guide rail serve as a single item. A fixed tab 246 extends upward from the main body 242 for use in opening the joining clamp 240 in cooperation with a pivoting lever described in the following.

The rearward second side of rigid main body 242 has rigid fixed elements serving in cooperation with a spring-biased pivoting clamping element 260 to provide a clamping effect. A fixed rigid brace 250, being a part of the main body, extends rearward to extend into, engage, and slide within a T-slot of the frame rail or other guide rail to which the joining clamp and its host guide rail are to be joined. For example in FIG. 4, the fixed rigid brace extends into, engage, and slide within the T-slot 110 of the slotted planar forward side 106 of the rearward frame rail 102. The brace 250 has a hole through which a hinge pin 252 (FIG. 12) extends to pivotally connect the clamping element 260, which utilizes the brace 250 as a fulcrum. The brace 250 has an upper contact face that engages particularly the upper edge of the narrow opening of a T-slot when placed.

Below the brace 250, a rigid planar contact plate 256 of the rigid main body 242 faces rearward to contact and slide along the forward side of the slotted rail to which the joining clamp 240 is to be joined. For example in FIG. 4, the contact plate 256 contacts the planar forward side 106 of the rearward frame rail 102 below the slot 110. The upper contact face of the brace 250 facing upward and the contact plate 256 facing rearward are perpendicular to each other to accommodate and match slotted guide rails having at least two adjacent perpendicular planar sides, for example referenced as neighbor sides 122 in FIGS. 5-6, and sides 104 and 106 in FIG. 4. The heads of the fasteners shown as four screws 244 (FIG. 12) are sunken or flush with respect to the surface of the contact plate 256 to facilitate intimate contact surface with a rail to which the joining clamp 240 is to be joined and to permit sliding of the joining clamp 240 along the rail without scuffing when the joining is opened for positional adjustment.

The clamping element 260 is pivotally connected to the rigid main body 242, and has a slot pivoting slot-engaging member, referenced as a lower arm 264 with a tooth 274 in the following. In further detail, the clamping element 260 has a yoke 258 and two upper arms 262 extending downward from the yoke around opposing lateral sides of the brace 250. A lower end of each upper arm defines a pivot point 263 of the clamping element, with a hinge hole through the pivot point for receiving the hinge pin 252. The pivot points 263 are colinear and together with the hinge pin 525 define the pivot axis of the clamping element 260 as parallel to a rail to which the joining clamp 240 is to be joined by clamping. A respective lower arm 264 extends rearward, approximately perpendicular to the upper arm, from each pivot point. The lower arm is received by and engages the same T-slot as the brace 250 when mounted on a slotted rail. Above the upper arms 264 and above the first rigid brace 250, a linear plate 266 extends from and pivots with the yoke 258 to contact and slide along the top side of the slotted rail to which the joining clamp 240 and its host guide rail are to be joined. For example in FIG. 4, the linear plate 266 contacts the planar top side 104 of the rearward frame rail 102. A respective downward extending tooth 274 at the distal end of each lower arm 264 engages the interior of the T-slot and retains the joining clamp 260 on the slotted rail, thereby joining the slotted rail and the host guide rail of the joining clamp 260 at approximately a right angle A (FIG. 2).

A pivoting lever 270 extends upward from the yoke 258 and is connected to the upper arms 262 by the yoke. The lever 270 has a well on its inward side facing the main body. A compression spring 272 is trapped in a well between the main body and lever 270, thus biasing the lever outward. The spring persistently biases the clamping element 260 to pivot into a locking position at which the plate 266 contacts the top side of the slotted rail to be joined. Clamping action is particularly performed in the locking position of the clamping element 260 by the toothed lower arm 254, biased by the force of the spring, presses down upon the lower edge of the narrow opening of a T-slot, opposite the upper contact face of the brace 250 that abuts and presses upward on the upper edge of the narrow opening of the same T-slot. The toothed lower arm 264 and brace 250 together implement a jamming engagement with the narrow opening of the T-slot arresting movement of the joining clamp 240 upon the slotted rail to be joined. The lever 270 has a catch hook 274 on its inward side facing the main body. The catch hook 274 is received (FIG. 11) by an opening in the main body 240 upon assembly and limits the pivot range of lever 270 to keep the spring in the well.

The immediately above descriptions reference the frame rail 102 as being mounted, its top side 104 as contacted by the linear plate 266, and its forward side slot 110 as receiving the rigid brace 250 and lower arms 264. These descriptions relate as well to examples in which the joining clamp 240 is mounted on guide rails other than the frame rail 102. In the examples of FIGS. 5 and 6, joining clamps 240 are mounted on respective guide rails 120, each having a top side contacted by the linear plate, and a forward side slot receiving the rigid brace and lower arms.

The clamping element 260 pivots under user force on the lever 270 from its biased locking position to an unlocked position, thereby opening the joining clamp 240. Advantageously, the fixed tab 246 extends upward from the main body in opposition to the pivoting lever 270 to permit a user to apply squeezing force by hand to open the joining clamp 240. Thus force need not be transferred to either the host guide rail or the slotted rail to be joined as the user squeezes the tab 246 and lever 270 together to open the joining clamp 240.

With the lever 270 pivoted toward the tab 246, the clamping element 260 thereby pivoted to an unlocked position, both the brace 250 and the lower arm 264 freely slide within a T-slot, permitting the joining clamp 240 to travel along a slotted rail to any user preferred position. Upon release of the lever 270, the clamping element 260 returns to its biased locking position thereby automatically locking the location of the joining clamp 240.

To mount the joining clamp 240 and its host guide rail to a slotted rail, the joining clamp 240 need not be moved to the longitudinal end of the slotted rail to enter the brace 250 and lower arm 264 into a slot as in the case of some prior art mounting arrangements as already described. Instead, advantageously, and like the mounting clamp 210 of the guide device 150, the joining clamp 240 can be installed onto a slotted rail by holding the clamping element 260 in its open position by use of the lever 270. This pivots each lower arm 264 upward to provide clearance of the tooth 274 into and from the slot. To mount or dismount the joining clamp, the clamping element can be held in its open position, and the brace 250 and each lower arm 264 can be inserted into or removed from a slot at any location. The joining clamp can be placed at any desired location, and by releasing the lever, the joining clamp 240 effectively snaps into engagement with the slotted rail. By use of the lever 270, the joining clamp 240 and its host guide rail can be easily connected to and disconnected from a slotted rail.

The pivoting edge guide device 150 described above is configured for mounting on a slotted rail, for example on the rearward leveling frame rail 22 of a long-arm quilting machine (FIG. 1), on a single clamping guide rail 120 as represented in FIG. 2, and on the forward double clamping guide rail 130 according to user preferences.

Figure 16A:
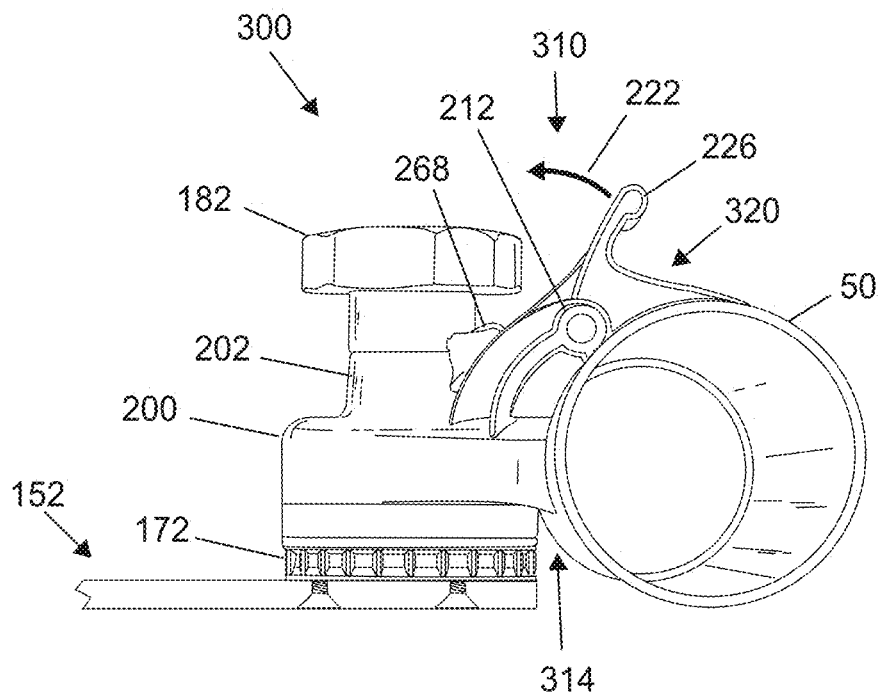
FIG. 16A is a perspective view of a pivoting edge guide device, according to another embodiment, mounted on a tubular bar.
Figure 16B:
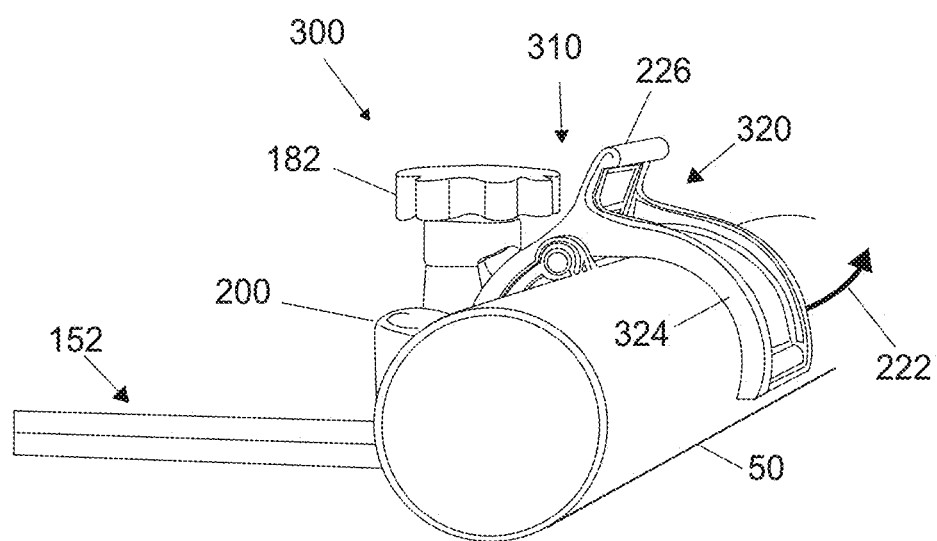
FIG. 16B is another perspective view of the pivoting edge guide device of FIG. 16A, showing the clamping element of the device engaged with the tubular bar.
Figure 16C:
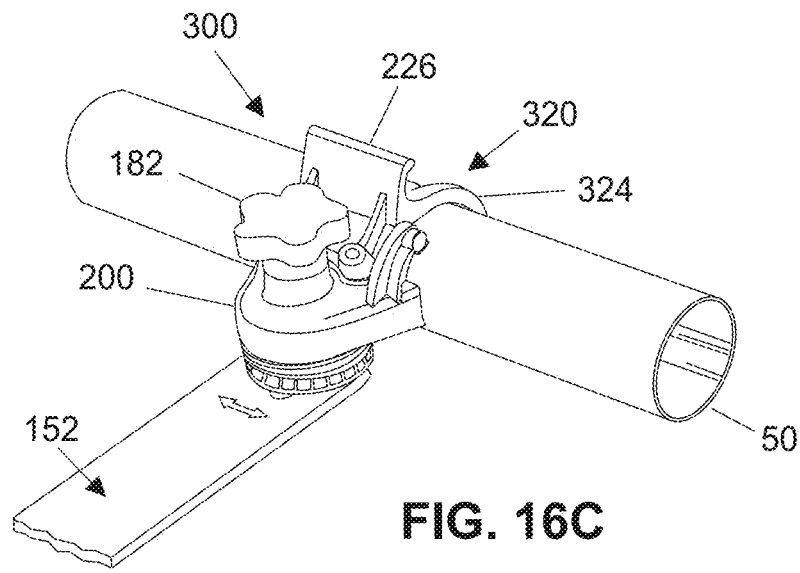
FIG. 16C is another perspective view of the pivoting edge guide device of FIG. 16A, showing the clamping element of the device engaged with the tubular bar.

Another embodiment of a pivoting edge device 300, as illustrated in FIGS. 16A-16C, is configured for mounting on a cylindrical rail 50, which can represent a tubular leveling bar in a sewing system. The edge guide device 300 of FIGS. 16A-16C has many features in common with those of the guide device 150, or similar thereto, such that the above descriptions apply as well except where differences are apparent in the following descriptions and/or by illustration.

The rigid main body of the guide device 300, referenced as the upper housing 200, carries a rearward mounting clamp 310 defined in part by rigid elements of the main body in cooperation with a spring-biased clamping element 320 pivotally mounted on the main body. The mounting clamp 310 includes a rigid fulcrum 212 and a rigid arcuate claw 314, which are fixed parts of the upper housing 200. The claw 314 extends rearward and engages and the cylindrical rail 50. The fulcrum 312 extends upward and rearward from the upper housing 200 and carries a spring biased clamping element 320 pivotally connected to the fulcrum 312 by a hinge pin. The clamping element 320 has a spaced pair of wells 268, each trapping a respective compression spring 272 (FIG. 10) with the upper housing 200.

The clamping element 320 has an arcuate hook 324 that engages the cylindrical rail 50, and a lever 226 that extends upward and rearward for manual operation of the mounting clamp 310. The springs within the wells 268 persistently bias the clamping element 320 to pivot into a locking position, at which the hook 324 engages the rail, clamping the rail between the hook and claw in a circumferential range of greater than 180 degrees for stability. For secure engagement, the hook 324 and/or claw 314 are advantageously tailor shaped and dimensioned, in some embodiments, for a particular diameter of the rail. In the illustrated embodiment, the hook 324 and claw 314 have each a concave interior circularly cylindrical contact surface matching the cylindrical exterior surface of the rail within an engineered allowance for tolerance.

The clamping element 320 pivots, as represented by pivot arrows 222 in an unlocking direction in FIGS. 16A-16B, under user force on the lever 226 from its biased locking position. With the lever 226 pulled forward, the mounting clamp 310 is opened. That is the clamping element 320 is pivoted to an open and unlocked position, at which both the rigid claw 314 and hook 324 receive and slide freely upon the cylindrical rail 50, permitting the guide device 300 to travel along the rail to any user preferred location. Upon release of the lever 226, the clamping element 320 returns to its biased locking position thereby arresting movement of the guide device 300 when mounted on a rail, locking the location of the guide device 300 on the rail by automatic engagement with the rail. Use of the pivoting edge guide 152 pivotally coupled to the upper housing 200 can then proceed similarly as represented in FIG. 10 with reference to the pivoting edge device 150.

The cylindrical rail 50 in FIGS. 16A-16C is shown as circularly tubular and the hook 324 is correspondingly shaped for engagement. Other embodiments may include other-shaped hooks corresponding to other-shaped rails, such as rectangular.

Figure 17:
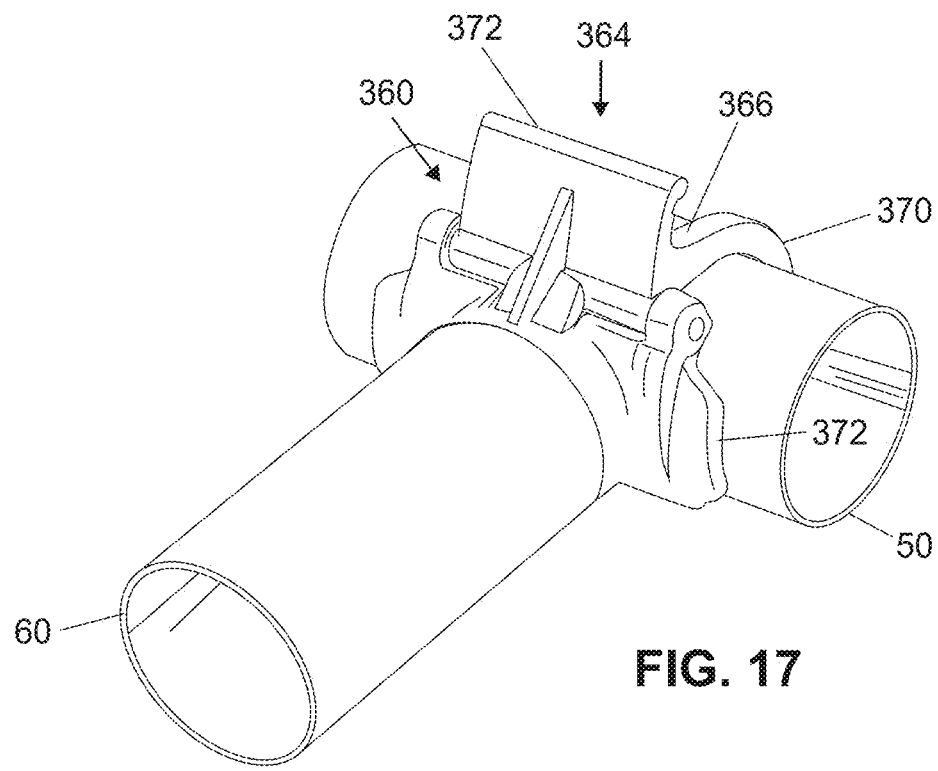
FIG. 17 is a perspective view of a positionable joining clamp, according to another embodiment, fixed on a first longitudinal end of a tubular bar.

FIG. 17 shows a joining clamp 360, according to at least one embodiment, fixed on a longitudinal end of a tubular bar 60. The joining clamp 360 has a forward joint 362 fixed to the tubular bar 60 and a rearward mounting clamp 364 having spring-biased pivoting clamping element 366. The clamping element 366 has an arcuate hook 370 that engages the tubular bar 60, and a lever 372 that extends upward and rearward for manual operation of the mounting clamp 364. The clamping element 366 is persistently biased to pivot into a locking position, at which the hook 370 engages the bar 50, clamping the bar 50 between the hook 370 and a rearward claw 372 in a circumferential range of greater than 180 degrees for stability. For secure engagement, the hook 370 and/or claw 372 are advantageously tailor shaped and dimensioned, in some embodiments, for a particular diameter of the bar 50. In the illustrated embodiment, the hook 370 and claw 372 have each a concave interior circularly cylindrical contact surface matching the cylindrical exterior surface of the rail within an engineered allowance for tolerance. The tubular bar 60, with the joining clamp, can be used by mounting the guide device 300 along the bar 60.

Figure 18:
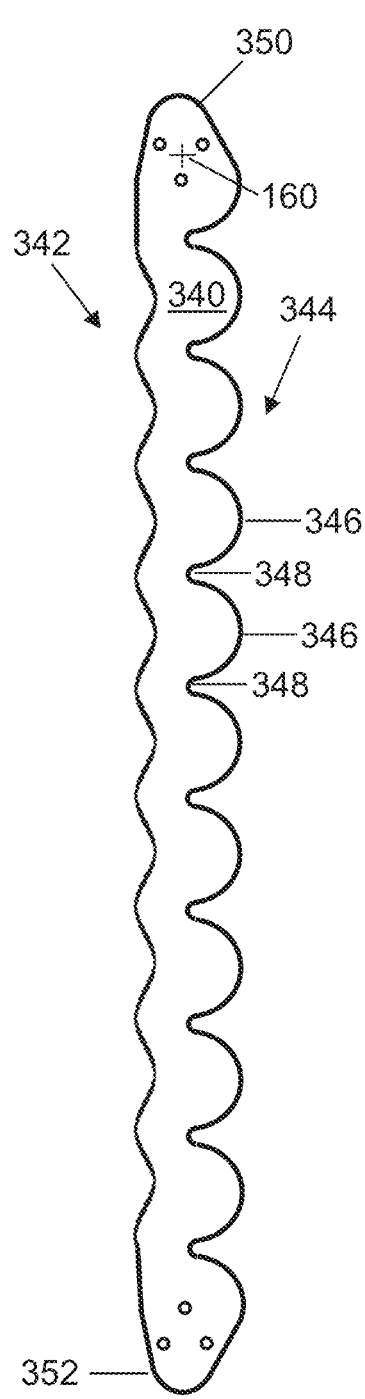
FIG. 18 a plan view of an edge guide having curved edges, according to at least one embodiment.

While FIG. 10 shows an edge guide device 150 in use guiding a linear stitch line 36 according to the linear edge 164 of the edge guide 152, other edge guides, for example having curved edges, are within the scope of these descriptions. FIG. 18 shows an edge guide 340 having opposed curved edges referenced as a first curved edge 342 and a second curved edge 344, each shaped to have a repeating decorative shape for guiding a corresponding stitch line in use. The first curved edge 342 is illustrated as sinusoidal, and the second curved edge is illustrated as having spaced alternating curved convex lobes 346 and curved concave recesses 348.

Figure 19:
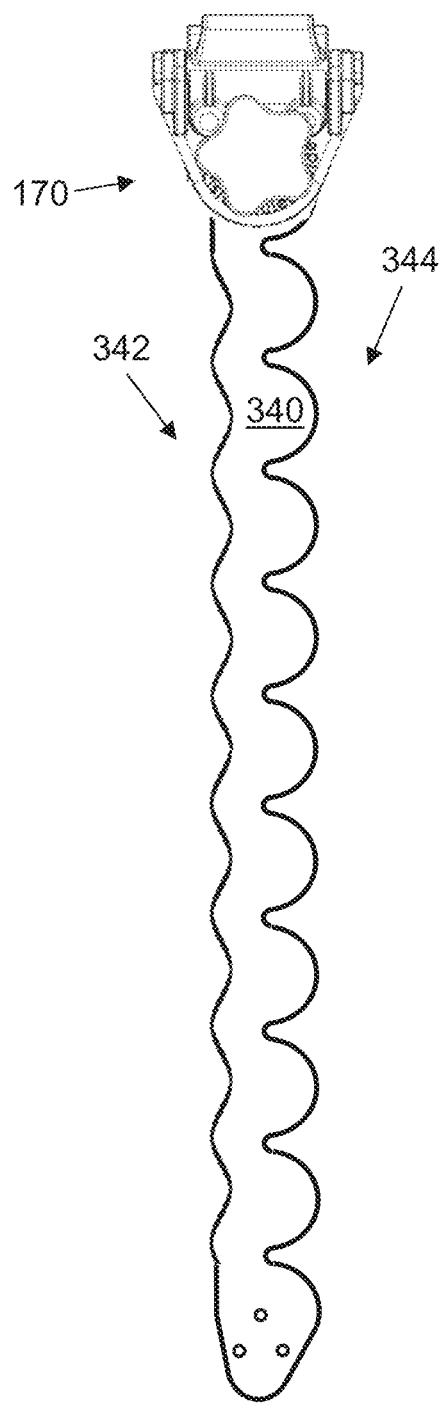
FIG. 19 is an overhead view of a pivoting guide device including the edge guide of FIG. 18.

The first end 350 of the edge guide 340 accommodates its rotation about a pivot axis 160 when attached to an edge guide mount 170 (FIG. 19). Like the proximal end 154 of the edge guide 152 (FIG. 7A), the first end 350 of the edge guide 340 of FIGS. 18-19 has three holes spaced around the pivot axis 160 to facilitate attachment to the edge guide mount 170 at the first end 350 by use of the fasteners 140 (FIG. 7). The second end 352 of the edge guide 340, opposite the first end 350, similarly has three holes spaced around a potential pivot axis to facilitate attachment to the edge guide mount 170 at the second end 352 by use of the fasteners 140 (FIG. 7). The two ends (350, 352) each having mounting holes accommodates allowing either left or right mounting. In addition this allows a repositioning of the edge guide mount so as to create a mirror image of the resulting quilting stitch line.

The edge guide mount 170 and edge guide 340 together define an embodiment of a pivoting edge guide device having an edge guide with at least one curved edge and otherwise bearing such similarity to the edge guide device 150 that the above-descriptions thereof otherwise apply.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. An edge device for guiding movement of a sew head relative to a stationary rail, the edge guide device comprising:
    a guide mount comprising:
    a rigid housing; and
    a mounting clamp carried by the rigid housing for mounting the edge guide device to the stationary rail, the mounting clamp including a pivoting clamping element persistently biased into a locking position, and
    an edge guide pivotally connected to the guide mount, the edge guide comprising at least a first edge for guiding movement of the sew head relative to the stationary rail, the first edge being linear or curved,
    wherein, in use mounted on the stationary rail, the pivoting clamping element in the locking position locks a location of the edge guide device on the stationary rail.

2. The edge guide device of claim 1, wherein:
    the mounting clamp comprises a rigid fulcrum and a rigid claw each affixed to the rigid housing, the rigid claw configured for engaging the stationary rail; and
    the clamping element is pivotally connected to the rigid fulcrum and is persistently biased into the locking position by a spring.

3. The edge guide device of claim 2, wherein:
    the clamping element comprises a chuck for engaging the stationary rail and a lever connected to the chuck for pivoting the clamping element from the locking position.

4. The edge guide device of claim 3, wherein the spring is trapped between the clamping element and the rigid housing.

5. The edge guide device of claim 3, wherein the rigid claw is configured for engaging a slot in the stationary rail.

6. The edge guide device of claim 1, further comprising:
    an axle bolt extending through the rigid housing and defining a pivot axis of the edge guide;
    a retainer affixed to a semicircular proximal end of the edge guide, the retainer having a cup; and
    an axle nut on and engaged with the axle bolt and trapped in the cup thereby pivotally connecting the edge guide to the guide mount by way of the retainer.

7. The edge guide device of claim 6, wherein tightening engagement of the axle bolt and axle nut by rotating the axle bolt increases a resistance to pivoting movement of the edge guide and loosening engagement of the axle bolt and axle nut by counter-rotating the axle bolt decreases the resistance permitting pivoting movement of the edge guide around the pivot axis.

8. The edge guide device of claim 7, wherein:
    the rigid housing comprises an interior circular well at least partially surrounding the pivot axis;
    the retainer has a circular bushing received and slidingly engaged by the well thereby maintaining concentricity of the pivoting movement of the edge guide around the pivot axis in cooperation with the axle bolt.

9. The edge guide device of claim 8, further comprising at least one spacer trapped between the retainer and rigid housing, the spacer comprising an annular ring surrounding the bushing and pivot axis.

10. The edge guide device of claim 9, wherein the circular bushing is defined by arcuate segments spaced around the pivot axis.

11. The edge guide device of claim 10, wherein the spacer comprises radially inward extensions connected to the ring, the extensions received by spacings between the arcuate segments.

12. The edge guide device of claim 6, wherein:
    the retainer comprises a dead center mark; and
    the rigid housing comprises a zero-degree mark to which a user can visually align the dead center mark to dispose the edge guide at a defined zero degree position.

13. The edge guide device of claim 1, wherein the mounting clamp comprises a rigid fulcrum and a rigid arcuate claw each affixed to the rigid housing, the rigid arcuate claw comprising a concave circularly cylindrical contact surface for engaging a cylindrical exterior surface of the stationary rail.

14. The edge guide device of claim 1, wherein the edge guide further comprises:
    a first end by which the edge guide is pivotally connected to the guide mount;
    a second end opposite the first end; and
    a second edge for guiding movement of the sew head, the second edge having a repeating shape for guiding a corresponding stitch line in use.

15. The edge guide device of claim 14, wherein:
    the first edge extends from the proximal end to the distal end, the first edge comprising at least one mounting hole by which the edge guide is connected to the guide mount; and
    the second edge extends from the proximal end to the distal end, the second edge comprising at least one mounting hole for alternatively mounting the edge guide to the guide mount,
    wherein by repositioning the edge guide from connection of the proximal end to the guide mount to connection of the distal end to the guide mount, mirror image quilting stitch lines can be created in use.

16. A clamping guide rail for mounting on a stationary slotted rail, the clamping guide rail comprising:
    a host guide rail comprising a first longitudinal end and an opposite second longitudinal end; and
    a joining clamp comprising:
    a rigid main body having a forward side connected to the first longitudinal end of the host guide rail;
    a rigid brace extending rearward from the rigid main body opposite the forward side of the rigid main body to be received in a slot in a forward side of the stationary slotted rail; and a clamping element pivotally connected to the rigid main body and persistently biased into a locking position, the clamping element comprising a pivoting slot-engaging member to be received in the slot in the forward side of the stationary slotted rail, wherein, in use mounted on the stationary slotted rail, the clamping element in the locking position locks a location of the clamping guide rail on the stationary slotted rail.

17. The clamping guide rail of claim 16, wherein the clamping element comprises:
   a first upper arm a lower end of which defines a first pivot point;
      a first lower arm extending from the first pivot point at least partially perpendicular to the first upper arm, the first lower arm defining the pivoting slot-engaging member to be received in the slot in the forward side of the stationary slotted rail; and
      a lever connected to the first upper arm for pivoting the clamping element around the pivot point from the locking position.

18. The clamping guide rail of claim 17, wherein the clamping element comprises a rearward extending linear plate above the first upper arm and above the rigid brace for contacting a top side of the stationary slotted rail.

19. The clamping guide rail of claim 17, wherein the clamping element further comprises:
   a second upper arm a lower end of which defines a second pivot point colinear with the first pivot point to define a pivot axis of the clamping element;
   a second lower arm extending from the second pivot point at least partially perpendicular to the second upper arm, the second lower arm be received in the slot in the forward side of the stationary slotted rail; and
   a yoke connecting the lever to the first upper arm and second upper arm for pivoting the clamping element around the pivot axis from the locking position.

20. The clamping guide rail of claim 19, wherein the first upper and second upper arm of the clamping element extend downward from the yoke and around opposing lateral sides of the rigid brace.

21. The clamping guide rail of claim 17, wherein, in the locking position of the clamping element, the first lower arm and brace together implement a jamming engagement with opposing edges of the slot in the forward side of the stationary slotted rail.

22. The clamping guide rail of claim 21, wherein the clamping element further comprises a downward extending tooth at a distal end of the lower arm for engaging an interior of the slot in the forward side of the stationary slotted rail.

* * * * *